United States Patent
Kim

(10) Patent No.: US 11,326,889 B2
(45) Date of Patent: May 10, 2022

(54) DRIVER ASSISTANCE SYSTEM AND CONTROL METHOD FOR THE SAME

(71) Applicant: MANDO MOBILITY SOLUTIONS CORPORATION, Pyeongtaek-si (KR)

(72) Inventor: Tae Han Kim, Seongnam-si (KR)

(73) Assignee: MANDO MOBILITY SOLUTIONS CORPORATION, Pyeongtaek-si (KR)

( * ) Notice: Subject to any disclaimer, the term of this patent is extended or adjusted under 35 U.S.C. 154(b) by 7 days.

(21) Appl. No.: 16/868,581

(22) Filed: May 7, 2020

(65) Prior Publication Data
US 2020/0363218 A1 Nov. 19, 2020

(30) Foreign Application Priority Data
May 17, 2019 (KR) .................. 10-2019-005 815 8

(51) Int. Cl.
| | |
|---|---|
| G01C 21/32 | (2006.01) |
| G01S 19/39 | (2010.01) |
| G01S 19/48 | (2010.01) |
| G01S 13/86 | (2006.01) |
| G06F 17/18 | (2006.01) |

(52) U.S. Cl.
CPC ............ G01C 21/32 (2013.01); G01S 13/867 (2013.01); G01S 19/393 (2019.08); G01S 19/485 (2020.05); G06F 17/18 (2013.01)

(58) Field of Classification Search
CPC ....... G01C 21/32; G01C 21/30; G01S 19/393; G01S 19/485; G01S 1913/867; G01S 13/86; G01S 2013/93271; G01S 2013/93274; G01S 13/931; G01S 19/50; G01S 19/14; G01S 19/48; G06F 17/18; G06K 9/00791; B60W 40/02; B60W 2050/0022
See application file for complete search history.

(56) References Cited

U.S. PATENT DOCUMENTS

| | | | |
|---|---|---|---|
| 2014/0324339 A1 | 10/2014 | Adam et al. | |
| 2018/0154901 A1 | 6/2018 | Hasberg et al. | |
| 2019/0122386 A1* | 4/2019 | Wheeler | G01C 25/00 |
| 2019/0154842 A1* | 5/2019 | Adachi | G01C 21/165 |
| 2020/0249332 A1* | 8/2020 | Pandey | G01S 17/86 |

FOREIGN PATENT DOCUMENTS

| | | |
|---|---|---|
| KR | 10-2016-0002178 A | 1/2016 |
| KR | 10-2016-0027817 A | 3/2016 |
| KR | 10-2016-0056129 A | 5/2016 |

OTHER PUBLICATIONS

Korean Office Action dated Feb. 24, 2020 corresponding to Korean Application No. 10-2019-0058158.

* cited by examiner

*Primary Examiner* — Marthe Y Marc-Coleman
(74) *Attorney, Agent, or Firm* — Hauptman Ham, LLP

(57) ABSTRACT

It is an aspect of the present disclosure to provide a driver assistance system and control method thereof in which perform a data association of various data to be collected, thereby matching a plurality of features and performing precise position measurement.

16 Claims, 7 Drawing Sheets

DRIVER ASSISTANCE SYSTEM AND CONTROL METHOD FOR THE SAME

CROSS-REFERENCE TO RELATED APPLICATION

This application is based on and claims priority under 35 U.S.C. § 119 to Korean Patent Application No. 10-2019-0058158, filed on May 17, 2019, in the Korean Intellectual Property Office, the disclosure of which is incorporated by reference herein in its entirety.

BACKGROUND

1. Field

Embodiments of the disclosure relate to a driver assistance system for determining a location of a vehicle based on a data association.

2. Description of the Related Art

In recent years, a system in which a camera provided in front of a vehicle detects a pedestrian from an image captured thereby and notifies a driver that a pedestrian is located in front of the vehicle has been developed, in case the driver fails to sense an external situation.

Further, a system in which an object in front of a vehicle is sensed using a radar provided in front of the vehicle and a driver is notified that a pedestrian is located in front of the vehicle has also been developed.

However, since two-dimensional information is acquired through an image acquired by the camera while the radar provided in front of the vehicle senses an object using the three-dimensional coordinate system (X, Y, Z), technologies for improving the accuracy of tracking locations and movements of objects including pedestrians through the fusion of radar and camera have been developed continuously.

SUMMARY

Therefore, it is an aspect of the present disclosure to provide a driver assistance system and control method thereof in which perform a data association of various data to be collected, thereby matching a plurality of features and performing precise position measurement.

In accordance with one aspect of the present disclosure, a driver assistance system include a camera provided in a vehicle to have a forward field of view of the vehicle and configured to acquire image data; a radar provided in the vehicle to have a field of sensing toward the outside of the vehicle and configured to acquire radar data; and a controller including at least one processor configured to process the image data acquired by the camera and the radar data acquired by the radar, wherein the controller detects a stationary obstacle, which is located in a stationary manner in front of the vehicle, on the basis of at least one of the image data and the radar data, determines a range of interest (ROI) around a location of the stationary obstacle on the basis of the radar data, identifies an object present within the ROI on the basis of the radar data, and determines the object as a pedestrian on the basis of a speed of the object toward a road along which the vehicle travels.

The controller may extract a plurality of features based on the image data and the HD map and measure a plurality of offsets by matching the plurality of features with the radar data.

The controller may obtain the confidence score and the probability distribution based on Integrated Probabilistic Data Association (IPDA) and calculate a weight for the plurality of feature information determined based on the confidence score and the probability distribution.

The controller may update an offset estimation value included in the weight based on a Kalman filter.

The controller may match the updated offset estimation value with the HD map, and stop the modification of the GPS data based on the matching result.

The controller may match the updated offset estimation value with the HD map and predict the offset estimation value with an offset of the current time point at an offset of a current point based on the matching result and a dynamics model.

The controller may match the offset of the current point with the HD map, and stop the modification of the GPS data based on the matching result.

The controller may match the offset of the current point with the HD map, and modify the GPS data based on the matching result and the offset of the current point.

The controller may determine a location of the vehicle in the HD map based on the modified GPS data.

In accordance with one aspect of the present disclosure, a controlling method of a driver assistance system com include acquiring image data by a camera provided in a vehicle to have a field of view (FOV); acquiring radar data by a radar sensor provided in the vehicle to have a field of sensing (FOS) including the region forward or a side of the vehicle; storing a High Definition (HD) map by a storage after receiving the HD map from outside; extracting a feature included in the HD map based on the image data and the radar data; and modifying a Global Positioning System (GPS) data including the HD map according to a feature determined based on a confidence score of extracted feature and a probability distribution.

The extracting may include extracting a plurality of features based on the image data and the HD map. Further, the modifying may include measuring a plurality of offsets by matching the plurality of features with the radar data, The modifying may include obtaining the confidence score and the probability distribution based on Integrated Probabilistic Data Association (IPDA); and calculating a weight for the plurality of feature information determined based on the confidence score and the probability distribution.

The modifying may include updating an offset estimation value included in the weight based on a Kalman filter.

The modifying may include matching the updated offset estimation value with the HD map; and stopping the modification of the GPS data based on the matching result.

The modifying may include matching the updated offset estimation value with the HD map, and predicting the offset estimation value with an offset of the current time point at an offset of a current point based on the matching result and a dynamics model.

The modifying may include matching the offset of the current point with the HD map; and stopping the modification of the GPS data based on the matching result.

The modifying may include matching the offset of the current point with the HD map; and modifying the GPS data based on the matching result and the offset of the current point.

The controlling method further may further include determining a location of the vehicle in the HD map based on the modified GPS data.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
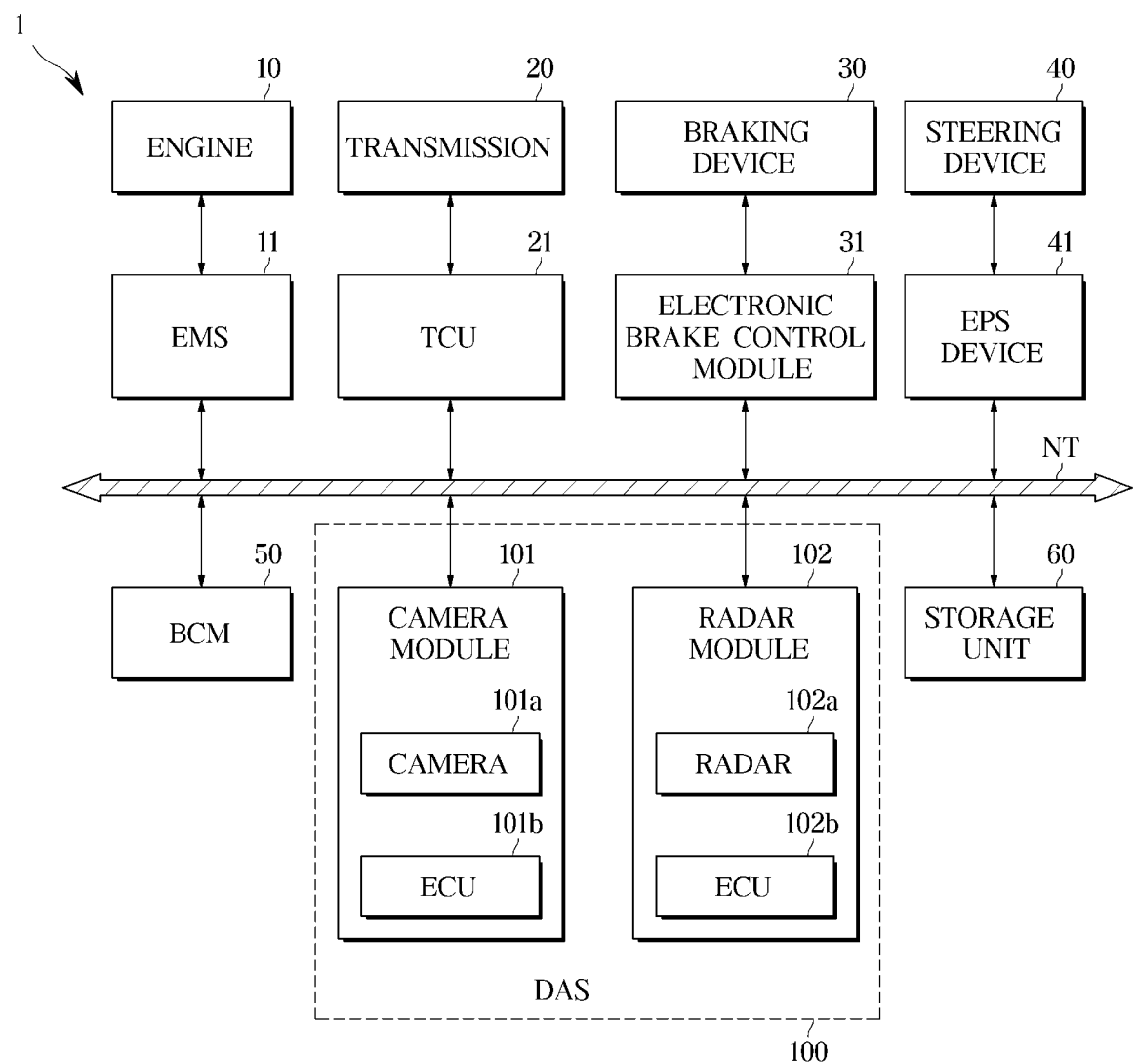
FIG. 1 illustrates a configuration of a vehicle according to an embodiment.

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

The principle and embodiments of the present disclosure will now be described with reference to accompanying drawings.

FIG. 1 illustrates a configuration of a vehicle 1 according to an embodiment.

Referring to FIG. 1, the vehicle 1 includes an engine 10, a transmission 20, a braking device 30, and a steering device 40. The engine 10 may include a cylinder and a piston and generate power for the vehicle 1 to travel. The transmission 20 may include a plurality of gears and transmit power generated by the engine 10 to vehicle wheels. The braking device 30 may decelerate or stop the vehicle 1 through friction with the vehicle wheels. The steering device 40 may change a direction in which the vehicle 1 travels.

The vehicle 1 may include a plurality of electronic components. For example, the vehicle 1 further includes an engine management system (EMS) 11, a transmission control unit (TCU) 21, an electronic brake control module 31, an electronic power steering (EPS) device 41, a body control module (BCM) 50, and a driver assistance system (DAS) 100.

The EMS 11 may control the engine 10 in response to the driver's acceleration intention through an accelerator pedal or to a request from the DAS 100. For example, the EMS 11 may control torque of the engine 10.

The TCU 21 may control the transmission 20 in response to the driver's gear shift command through a shift lever and/or to a traveling speed of the vehicle 1. For example, the TCU 21 may adjust a gear ratio from the engine 10 to the vehicle wheels.

The electronic brake control module 31 may control the braking device 30 in response to the driver's braking intention through a brake pedal and/or to slip of the vehicle wheels. For example, the electronic brake control module 31 may temporarily release braking of the vehicle wheels in response to the slip of the vehicle wheels that is sensed while the vehicle 1 is braked (anti-lock braking systems (ABS)). The electronic brake control module 31 may selectively release braking of the vehicle wheels in response to oversteering and/or understeering that is sensed while the vehicle 1 is steered (electronic stability control (ESC)). In addition, the electronic brake control module 31 may cause the vehicle wheels to be temporarily braked in response to the slip of the vehicle wheels that is sensed while the vehicle 1 is driven (traction control system (TCS)).

The EPS device 41 may assist operation of the steering device 40 so that the driver may easily manipulate a steering wheel in response to the driver's steering intention through the steering wheel. For example, the EPS device 41 may assist the operation of the steering device 40 such that a steering force is decreased during low-speed traveling or parking and is increased during high-speed traveling.

The BCM 50 may control operations of electronic components that either provide convenience to the driver or guarantee safety of the driver. For example, the BCM 50 may control a headlamp, a wiper, a cluster, a multi-functional switch, a turn signal lamp, and the like.

The storage unit 60 may store various data that the vehicle 1 receives from the outside. For example, the storage unit 60 stores a High Definition Map (HD map) through an Audio Video Navigation (AVN) apparatus provided in the vehicle 1 or a communication network. The HD map is a 3D map for autonomous driving, and includes static data for stationary objects such as lane, landmark, traffic sign, median strip, and curb, and dynamic target data such as nearby vehicles, road surface conditions, and traffic signals.

The HD map is received from a map provider called the Mobile Mapping System (MMS) because of a capacity and variability of the dynamic target data. The storage unit 60 stores the HD map transferred by the map supplier, and then provides the HD map to the DAS 100 upon request. The DAS 100 may use the data relating to the travel environment acquired from the camera module 101 and the radar module 102, to update the received HD map. In accordance with the disclosed embodiment, The Global Positioning System (GPS) data to be displayed on the display unit 10 may be modified by the received HD Map.

The DAS 100 may assist the driver's manipulating (driving, braking, steering) of the vehicle 1. For example, the DAS 100 may sense the environment around the vehicle 1 (e.g., other vehicles, pedestrians, lanes, road signs) and control driving and/or braking and/or steering of the vehicle 1 in response to the sensed environment.

The DAS 100 may provide various functions to the driver. For example, the DAS 100 may provide lane departure warning (LDW), lane keeping assist (LKA), high beam assist (HBA), autonomous emergency braking (AEB), traffic sign recognition (TSR), smart cruise control (SCC), blind spot detection (BSD), and the like.

The DAS 100 includes a camera module 101 configured to acquire image data around the vehicle 1 and a radar module 102 configured to acquire object data around the vehicle 1.

The camera module 101 may include a camera 101a and an electronic control unit (ECU) 101b and may capture an image of the view in front of the vehicle 1 and detect other vehicles, pedestrians, lanes, road signs, and the like.

The radar module 102 may include a radar 102a and an ECU 102b and acquire relative locations, relative speeds, and the like of objects around the vehicle 1 (e.g., other vehicles, pedestrians).

The above-listed electronic components may communicate with each other via a vehicle communication network NT. For example, the electronic components may transmit and receive data via the Ethernet, media oriented systems transport (MOST), Flexray, controller area network (CAN), local interconnect network (LIN), and the like. For example, the DAS 100 may transmit a driving control signal, a braking signal, and a steering signal via the vehicle communication network NT to the EMS 11, the electronic brake control module 31, and the EPS device 41, respectively.

Figure 2:
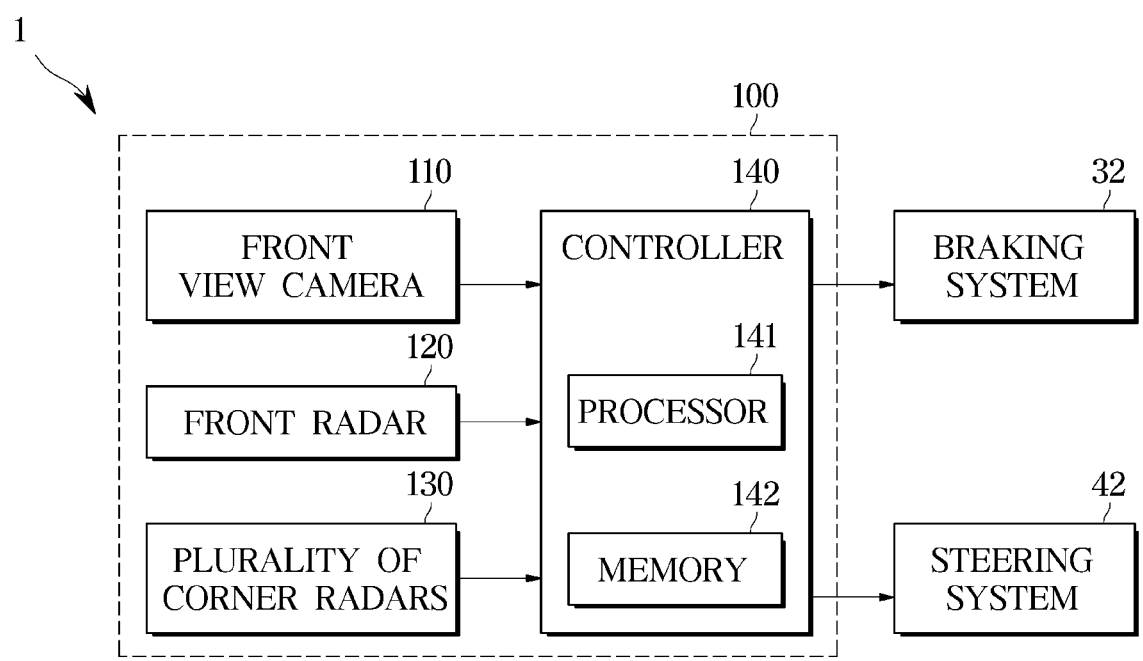
FIG. 2 illustrates a configuration of a driver assistance system according to an embodiment.
Figure 3:
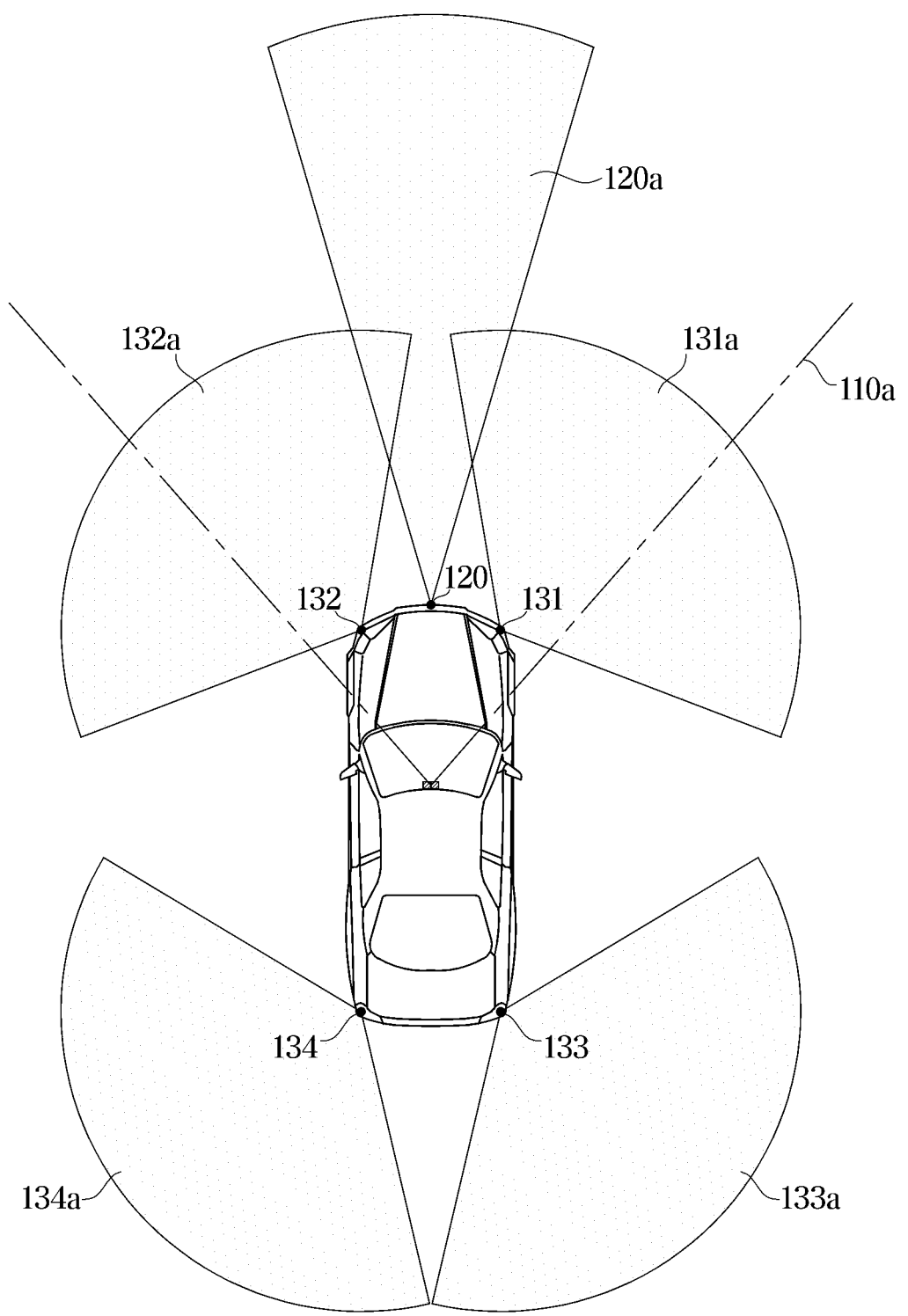
FIG. 3 illustrates a camera and a radar included in the driver assistance system according to an embodiment.

FIG. 2 illustrates a configuration of the DAS 100 according to an embodiment. FIG. 3 illustrates a camera 110 and radars 120 and 130 included in the DAS 100 according to an embodiment.

As illustrated in FIG. 2, the vehicle 1 may include a braking system 32, a steering system 42, and the DAS 100.

The braking system 32 may include the electronic brake control module 31 (see FIG. 1), which has been described above with reference to FIG. 1, and the steering system 42 may include the EPS device 41 (see FIG. 1) and the steering device 40 (see FIG. 1).

The DAS 100 may include a front view camera 110, a front radar 120, and a plurality of corner radars 130.

As illustrated in FIG. 3, the front view camera 110 may have a forward field of view 110a of the vehicle 1. For example, the front view camera 110 may be provided at a front windshield of the vehicle 1.

The front view camera 110 may capture an image of the view in front of the vehicle 1 and may acquire image data of the view in front of the vehicle 1. The image data of the view in front of the vehicle 1 may include location information on other vehicles, pedestrians, or lanes located in front of the vehicle 1.

The front view camera 110 may include a plurality of lenses and image sensors. The images sensors may include a plurality of photodiodes configured to convert light to an electrical signal, wherein the plurality of photodiodes may be disposed in a two-dimensional matrix.

The front view camera 110 may be electrically connected to a controller 140. For example, the front view camera 110 may be connected to the controller 140 via the vehicle communication network NT, connected to the controller 140 via a hard wire, or connected to the controller 140 via a printed circuit board (PCB).

The front view camera 110 may transmit the image data of the view in front of the vehicle 1 to the controller 140.

As illustrated in FIG. 3, the front radar 120 may have a field of sensing 120a toward an area in front of the vehicle 1. For example, the front radar 120 may be provided at a grille or a bumper of the vehicle 1.

The front radar 120 may include a transmission antenna (or transmission antenna array) configured to radiate a transmitted wave toward the area in front of the vehicle 1 and a reception antenna (or reception antenna array) configured to receive a reflected wave reflected from an object. The front radar 120 may acquire front radar data from the transmitted wave transmitted by the transmission antenna and the reflected wave received by the reception antenna. The front radar data may include distance information and speed information on other vehicles or pedestrians located in front of the vehicle 1. The front radar 120 may compute a relative distance to an object on the basis of a phase difference (or time difference) between the transmitted wave and the reflected wave and may compute a relative speed of the object on the basis of a frequency difference between the transmitted wave and the reflected wave.

For example, the front radar 120 may be connected to the controller 140 via the vehicle communication network NT, the hard wire, or the PCB. The front radar 120 may transmit the front radar data to the controller 140.

The plurality of corner radars 130 includes a first corner radar 131 provided at the front right side of the vehicle 1, a second corner radar 132 provided at the front left side of the vehicle 1, a third corner radar 133 provided at the rear right side of the vehicle 1, and a fourth corner radar 134 provided at the rear left side of the vehicle 1.

As illustrated in FIG. 3, the first corner radar 131 may have a field of sensing 131a toward an area at the front right side of the vehicle 1. For example, the first corner radar 131 may be provided at the right side of a front bumper of the vehicle 1. The second corner radar 132 may have a field of sensing 132a toward an area at the front left side of the vehicle 1. For example, the second corner radar 132 may be provided at the left side of the front bumper of the vehicle 1. The third corner radar 133 may have a field of sensing 133a toward an area at the rear right side of the vehicle 1. For example, the third corner radar 133 may be provided at the right side of a rear bumper of the vehicle 1. The fourth corner radar 134 may have a field of sensing 134a toward an area at the rear left side of the vehicle 1. For example, the fourth corner radar 134 may be provided at the left side of the rear bumper of the vehicle 1.

Each of the first, second, third, and fourth corner radars 131, 132, 133, and 134 may include a transmission antenna and a reception antenna. The first, second, third, and fourth corner radars 131, 132, 133, and 134 may acquire first corner radar data, second corner radar data, third corner radar data, and fourth corner radar data, respectively. The first corner radar data may include distance information and speed information on other vehicles or pedestrians (hereinafter referred to as "objects") located at the front right side of the vehicle 1. The second corner radar data may include distance information and speed information on objects located at the front left side of the vehicle 1. The third corner radar data and fourth corner radar data may include distance information and speed information on objects located at the rear right side of the vehicle 1 and the rear left side of the vehicle 1, respectively.

For example, each of the first, second, third, and fourth corner radars 131, 132, 133, and 134 may be connected to the controller 140 via the vehicle communication network NT, the hard wire, or the PCB. The first, second, third, and fourth corner radars 131, 132, 133, and 134 may transmit the first corner radar data, the second corner radar data, the third corner radar data, and the fourth corner radar data, respectively, to the controller 140.

The controller 140 may include the ECU 101*b* (see FIG. 1) of the camera module 101 (see FIG. 1) and/or the ECU 102*b* (see FIG. 1) of the radar module 102 (see FIG. 1) and/or a separate integrated ECU.

The controller 140 includes a processor 141 and a memory 142.

The processor 141 may process the front view image data of the front view camera 110, the front radar data of the front radar 120, and the corner radar data of the plurality of corner radars 130 and may generate a braking signal and a steering signal for controlling the braking system 32 and the steering system 42. For example, the processor 141 may include an image signal processor configured to process the front view image data of the front view camera 110 and/or a digital signal processor configured to process the radar data of the radars 120 and 130 and/or a micro control unit (MCU) configured to generate the braking signal and the steering signal.

The processor 141 may sense objects (e.g., other vehicles, pedestrians) in front of the vehicle 1 on the basis of the front view image data of the front view camera 110, the front radar data of the front radar 120, and the corner radar data of the plurality of corner radars 130.

Specifically, the processor 141 may acquire location information (distance and direction) and speed information (relative speed) of the objects in front of the vehicle 1 on the basis of the front radar data of the front radar 120 and the corner radar data of the plurality of corner radars 130.

That is, the processor 141 may acquire location information (distance and direction) and speed information (speed) on the objects in front of the vehicle 1 relative to the vehicle 1 on the basis of the radar data of the radars 120 and 130.

The processor 141 may acquire location information (direction) and type information (for example, whether an object is another vehicle, a pedestrian, or the like) of the objects in front of the vehicle 1 on the basis of the front view image data of the front view camera 110. In addition, the processor 141 may match the objects sensed from the front view image data with the objects sensed from the front radar data and may acquire the type information, location information, and speed information on the objects in front of the vehicle 1 on the basis of a result of matching.

The processor 141 may generate a braking signal and a steering signal on the basis of the type information and location information on the objects in front of the vehicle 1.

For example, the processor 141 may compute a time-to-collision (TTC) between the vehicle 1 and the objects in front of the vehicle 1 on the basis of the location information (distance) and speed information (relative speed) of the objects in front of the vehicle 1 and may warn the driver of collision or transmit a braking signal to the braking system 32 on the basis of a result of comparison between the TTC and a predetermined reference time. In response to a TTC that is less than a predetermined first reference time, the processor 141 may output a warning through an audio and/or a display. In response to a TTC that is less than a predetermined second reference time, the processor 141 may transmit a prior braking signal to the braking system 32. In response to a TTC that is less than a predetermined third reference time, the processor 141 may transmit an emergency braking signal to the braking system 32. In this case, the second reference time is less than the first reference time, and the third reference time is less than the second reference time.

In another example, the processor 141 may compute a distance-to-collision (DTC) on the basis of the speed information (relative speed) on the objects in front of the vehicle 1 and may warn the driver of a collision or transmit a braking signal to the braking system 32 on the basis of a result of comparison between the DTC and distances to the objects in front of the vehicle 1.

In addition, the processor 141 may warn the driver of a collision or transmit a steering signal to the steering system 42 on the basis of a result of comparison between the TTC and a predetermined reference time. In response to a TTC that is less than the predetermined first reference time, the processor 141 may output a warning through an audio and/or a display. In response to a TTC that is less than the predetermined second reference time, the processor 141 may transmit a prior steering signal to the steering system 42. In response to a TTC that is less than the predetermined third reference time, the processor 141 may transmit an emergency steering signal to the steering system 42. In this case, the second reference time is less than the first reference time, and the third reference time is less than the second reference time.

In another example, the processor 141 may compute a DTC on the basis of the speed information (relative speed) on the objects in front of the vehicle 1 and may warn the driver of a collision or transmit a steering signal to the steering system 42 on the basis of a result of comparison between the DTC and distances to the objects in front of the vehicle 1.

In addition, the processor 141 may acquire location information (distance and direction) and speed information (speed) of objects at the sides (the front right side, front left side, rear right side, rear left side) of the vehicle 1 relative to the vehicle 1 on the basis of the corner radar data of the plurality of corner radars 130.

The memory 142 may store programs and/or data for allowing the processor 141 to process image data, programs and/or data for allowing the processor 141 to process radar data, and programs and/or data for allowing the processor 141 to generate a braking signal and/or a steering signal.

The memory 142 may temporarily store image data received from the front view camera 110 and/or radar data received from the radars 120 and 130 and may temporarily store a result of processing the image data and/or radar data by the processor 141.

The memory 142 temporarily stores the HD map received from the storage unit 60. When the processor 141 determines a location of the vehicle 1 to be described below, the memory 142 provides the stored HD map, image data and radar data.

The memory 142 may include a nonvolatile memory such as a flash memory, a read only memory (ROM), and an erasable programmable ROM (EPROM) as well as a volatile memory such as a static random access memory (S-RAM) and a dynamic RAM (D-RAM).

Figure 4:
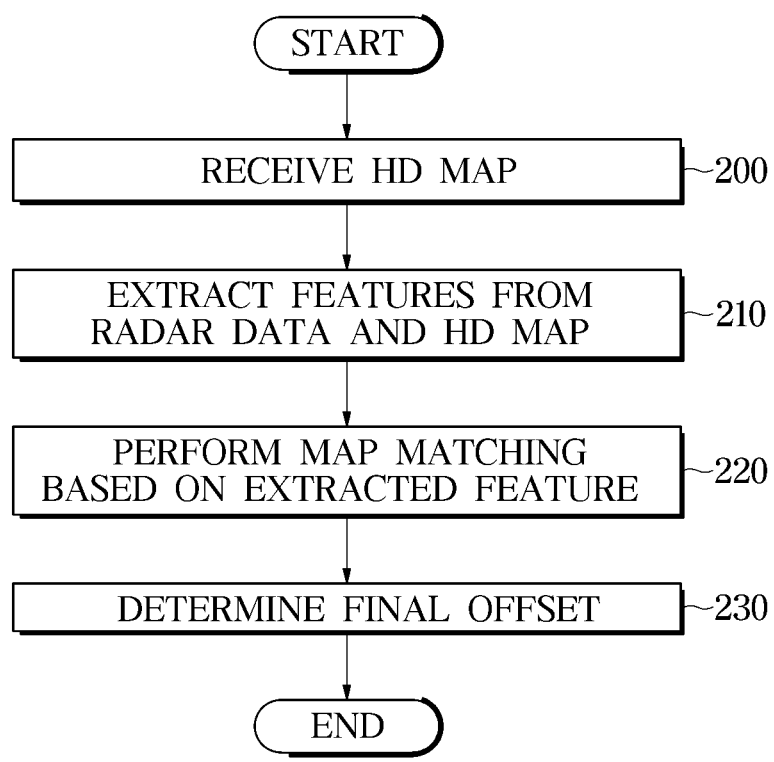
FIG. 4 is a flowchart illustrating a control method of driver assistance system according to an embodiment of disclosure.

FIG. 4 is a flowchart illustrating a control method of driver assistance system according to an embodiment of disclosure.

Referring to FIG. 4, the controller 140 of the DAS 100 receives the HD map (200).

The controller 140 confirms the GPS data included in the HD map. The HD map may include various data such as a median strip, a curb, a nearby vehicle, and a lane. After the controller 140 receives the GPS data from the vehicle 1, the controller 140 matches the received HD map with GPS data, and confirms a current location of the vehicle 1 on the HD map.

The controller 140 extracts features from the radar data and the HD map (210).

The feature means a special structure or a salient object necessary for modifying the location of the vehicle 1, among the dynamic target data and static data included in the HD map. For example, when there is a traffic light on the HD map ahead of the vehicle by a predetermined distance, the controller 140 may extract the traffic light as feature.

The controller 140 may extract the feature in the order of Measurement Preprocessing, Measurement Selection and Feature Extraction. In particular, the Measurement Preprocessing and Measurement Selection means a process in which the controller 140 recognizes object data after quantifying each value included in the HD map and the radar data. Feature Extraction refers to the selection of several objects that are characteristic of recognized object data.

Specific examples of Feature Extraction will be described later with reference to other drawings.

The controller 140 performs a map matching based on the extracted feature (220).

Specifically, the controller 140 selects feature that can serve as a reference for modifying the GPS data in the feature extracted in step 210. The controller 140 obtains a confidence score for each feature. Then, the controller 140 performs a Tracking Update for modifying the GPS data according to the selected feature based on the obtained confidence score and probability distribution.

The controller 140 determines the final offset determined by the Tracking Update as the final data of the GPS data (230), determines a current location of the vehicle 1 as the modified GPS data, and then operates the DAS 100.

On the other hand, the map matching means a series of processes of modifying the GPS data received from the extracted feature. The extracted feature may be generated based on the HD map and the radar data, and The GPS data may be modified by the extracted feature. That is, the control method of the DAS 100 is not necessarily limited to the word of the map matching. A detailed description of the map matching will be given later with reference to other drawings.

Figure 5:
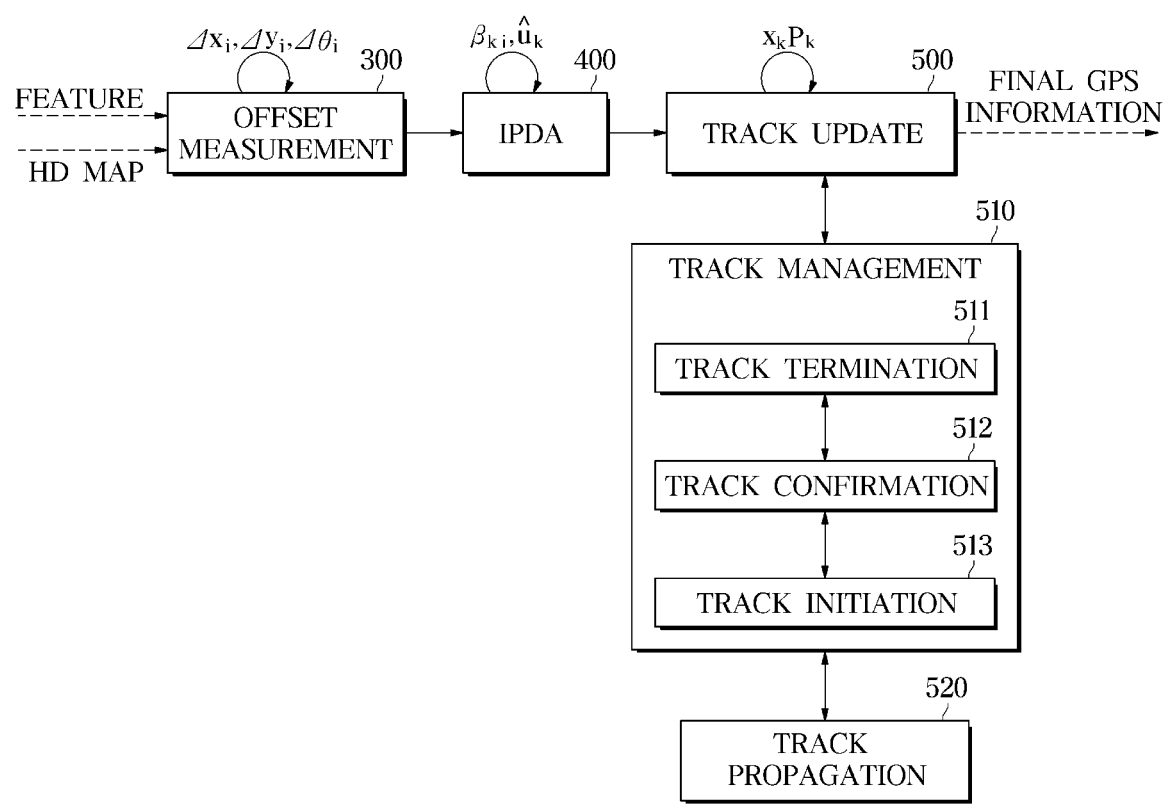
FIG. 5 is a drawing illustrating the map matching in detail.
Figure 6:
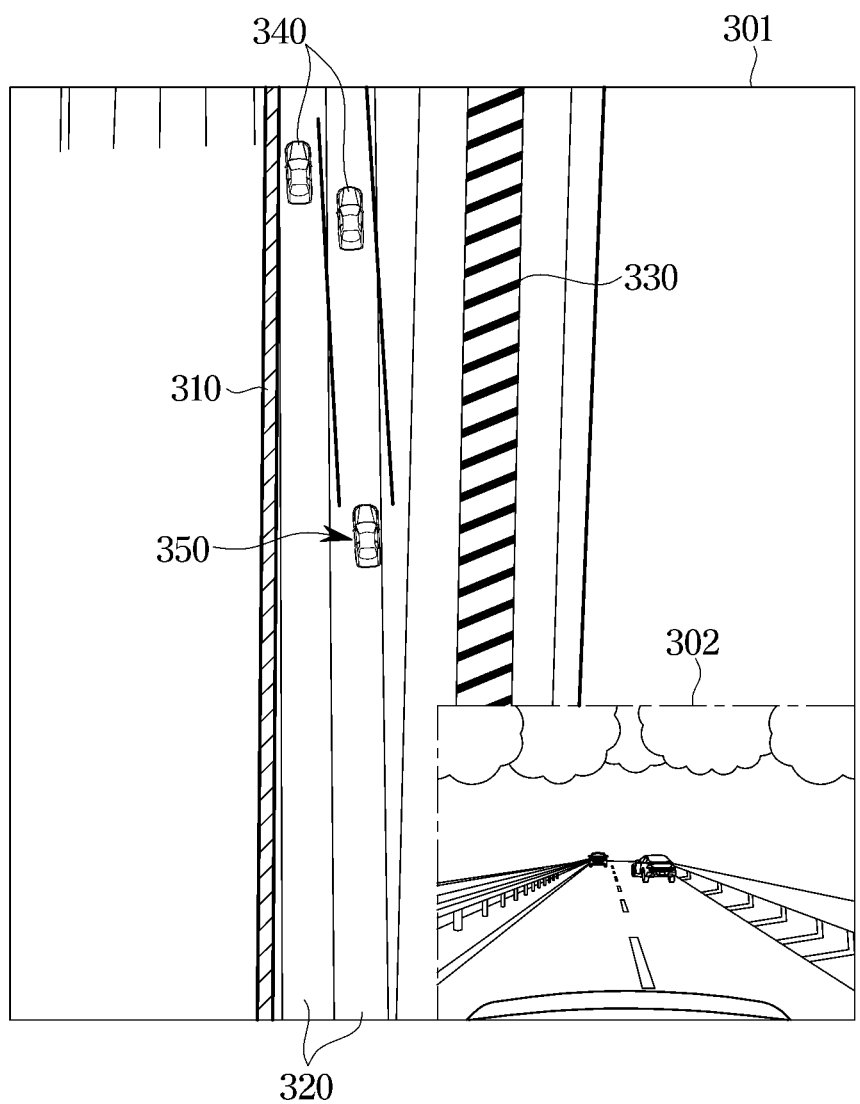
FIG. 6 is a drawing illustrating an example of an Offset Measurement.
Figure 7:
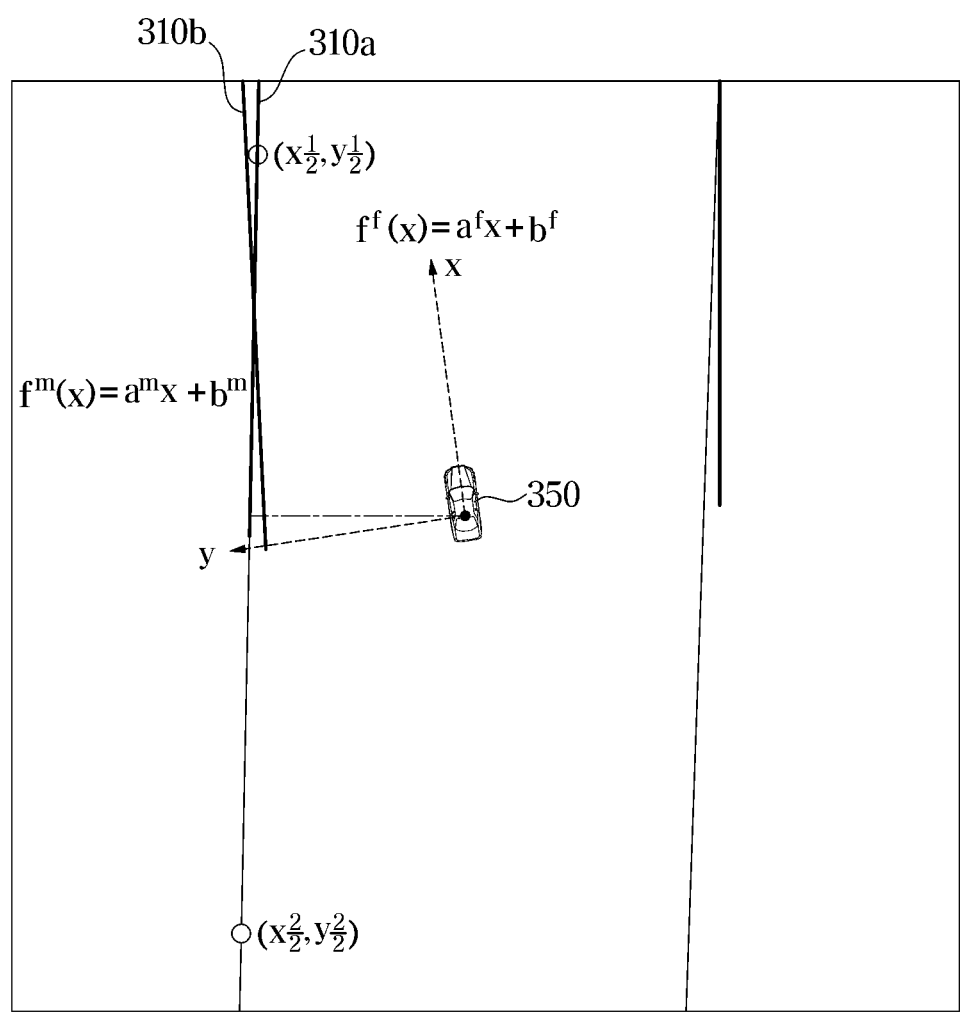
FIG. 7 is a drawing illustrating each offset.

FIG. 5 is a drawing illustrating the map matching in detail. FIG. 6 is a drawing illustrating an example of an Offset Measurement. FIG. 7 is a drawing illustrating each offset.

Referring to FIG. 5, the map matching is performed using Offset Measurement 300, Integrated Probabilistic Data Association (IPDA) 400, Track Update 500, Track Management 510, and Track Propagation, 520.

First, the offset measurement 300 means obtaining offset corresponding to each feature.

Specifically, the controller 140 measures offsets ($\Delta X_i$, $\Delta Y_i$, $\Delta \Theta_i$) from the HD map including the extracted feature and the radar data. The extracted feature may refer to an object located in the periphery of the vehicle 1, as described above.

Referring to FIG. 6, the HD map stored in the storage unit 60 may be simplified as in the HD map 301 by updating the image data 302 captured by the front camera 110. The HD map 301 may include the location of the vehicle 1 based on the received GPS data 350 together.

When the extracted feature is median strip 310, lane 320, curb 330 and peripheral vehicle 340, then the offset i may include a number from one to four.

Referring to FIG. 7, the controller 140 may measure the offset for the median strip 310 at the first offset (i=1) of the feature. Specifically, the controller 140 calculates the offsets ($\Delta X_i$, $\Delta Y_i$, $\Delta \Theta_i$) based on the difference between the median strip 310a included in the HD map 301 and the median strip 310b extracted by the radar data.

The controller 140 make superimposes the radar data and the HD map based on the GPS data 350 as shown in FIG. 7. The median strip 310 according to one example may be measured at different angles relative to the GPS data 350.

Specifically, the median strip 310a included in the HD map 301 may be obtained as a linear equation having a slope $a^f$ and an Y axis value $b^f$. Also, the median strip 310b included in the radar data may be obtained as a linear equation having a slope $a^m$ and an Y axis value $b^m$. The controller 140 measures the angle offset $\Delta \theta_i$ through the above-described slope and Equation (1).

$$\Delta\theta_1 = a^f - a^m \text{(Angle offset)} \qquad \text{[Equation 1]}$$

The controller 140 may measure the X-axis offset $\Delta X1$ and the Y-axis offset $\Delta Y1$ through a second-order matrix as shown in Equation (2) below.

$$\begin{bmatrix} \Delta x_1 \\ \Delta y_1 \end{bmatrix}^{global} = R_{local}^{global} \begin{bmatrix} \Delta x \\ \Delta y \end{bmatrix}^{local} \qquad \text{[Equation 2]}$$

Meanwhile, the Offset Measurement 300 described in FIGS. 6 and 7 is an example for explaining the extracted features and the offset required for modification of the GPS data. Therefore, the disclosed DAS 100 suffices to measure the offset through various methods.

Referring again to FIG. 5, the controller 140 may perform IPDA 400 after completing the Offset Measurement on the extracted features.

The IPDA 400 means to determine feature as a reference for modifying GPS data among a plurality of pieces of features based on the confident score and the probability distribution. For example, when four features are extracted in FIG. 6, the controller 140 acquires confident score ($\mu_k$) for the four features. And the controller 140 calculates the probability distribution ($\mu_{k,\ i}$) based on the IPDA for a plurality of offsets calculated from the respective features.

The controller 140 may obtain the confident score through the following equations (3) and (4).

$$\hat{\mu}_k \equiv P(x_k \mid Z^k) = \frac{\Lambda_k \bar{\mu}_{k-1}}{1 - (1 - \Lambda_k)\bar{\mu}_{k-1}} \qquad \text{[Equation 3]}$$

$$\Lambda_k = 1 - P_D P_G + P_D P_G \sum_{i=1}^{m_k} \frac{P_{k,i}}{\rho_{k,i}} \qquad \text{[Equation 4]}$$

'$P_D P_G$' is priori probability, '$P_{k,i}$' is a likelihood function and '$\rho_{k,i}$' is the measurement density. 'l' is the number of features, and 'k' means a time when data is collected.

The controller 140 calculates a weight for a plurality of features using a confidence score as well as a probability distribution. For example, even in the case including a feature (for example, a median on a highway) obtained with a high confidence score at the first time point, the confidence score may be low in a vehicle running on a curved road. Accordingly, the controller 140 determines weights to each features using a confidence score and a probability distribution, thereby determining feature suitable for the situation.

Specifically, the controller 140 may calculate a weight value, that is, an offset representative estimated value $X_k$ and an error covariance $P_k$ using Gaussian Mixture State Estimates as shown in Equation (5).

$$\hat{x}_k = \sum_{i=0}^{m_k} \beta_{k,i} \hat{x}_{k,i}$$

$$P_k = \sum_{i=0}^{m_k} \beta_{k,i} \left( \hat{P}_{k,i} + (\hat{x}_{k,i} - \hat{x}_k)(\hat{x}_{k,i} - \hat{x}_k)^T \right)$$

[Equation 4]

The controller 140 corrects the GPS data based on the representative estimated value and the error covariance calculated through Equation (5) from the respective feature information. The DAS 100 may modify the GPS data based on the most reliable feature among the various state information collected by vehicles 1 and improve the stability and accuracy of the DAS 100.

On the other hand, in Equation (5), the offset is described only on the X axis, but the Y-axis may also be calculated through the same method.

The offset estimation value and the error covariance calculated through Equation (5) are transmitted to the Track Update (500). The controller 140 determines a final offset (feature) necessary for correction of the final GPS data after modifying the representative estimate of the offset through a process described below.

The controller 140 executes Track Update 500 with the selected offset.

Specifically, the Track Update 500 refers to compare an offset estimation value and an error covariance $(X_{k-1}, P_{k-1})$ in the previous step with an offset estimation value and an error covariance $(X_k, P_k)$ using Kalman filter, and modify the offset estimation value and the error covariance $(X_{k-1}, P_{k-1})$ calculated in the previous step according to the comparison result.

The DAS 100 collects radar data and camera data at each time point. The DAS 100 compares the offset estimation value calculated at each step (time point) with the error covariance calculated at each step (time point).

On the other hand, when the Track Update 500 proceeds, the controller 140 receives the updated offset estimation value and the updated error covariance from the Track Update 500, and then performs Track Management 510.

The Track Management 510 may be subdivided into a Track Termination 511, a Track Confirmation 512, and a Track Initiation 513. Specifically, the Track Management 510 compares the updated offset estimation value and the updated error covariance $(X_{k-1}, P_{k-1})$ with the HD map, and confirm (512) whether to stop (511) the track update or whether the track update is to be continued (513) according to how much the matching is done with each other.

When the predetermined reference value is higher than the confidence score $(\mu_k)$ indicating the degree to which the offset estimation value and the error covariance $(X_{k-1}, P_{k-1})$ matches the HD map, the controller (140) discards the offsets $(\Delta X_i, \Delta Y_i, \Delta \Theta_i)$ that may be based on the modification of the GPS data and perform the entire process again from the step 210 of FIG. 4.

When the predetermined reference value is lower than the confidence score $(\mu_k)$ indicating the degree to which the offset estimation value and the error covariance $(X_{k-1}, P_{k-1})$ matches the HD map, The Track Management 510 may decide to proceed with the Track Promotion 520.

The Track Propagation 520 predicts the future through a dynamic model. The Track Propagation 520 estimates the offset estimation value and the error covariance $(X'_{k-1}, P'_{k-1})$ predicted at the current time using the offset estimation value and the error covariance $(X_{k-1}, P_{k-1})$ The predicted offset representative estimate and the predicted error covariance $(X'_k, P'_k)$ are passed back to the Track Management 510. The Track Management 510 may determines whether to continue to modify the results of track promotion 520 by matching the predicted offset representative estimate and the predicted error covariance $(X'_k, P'_k)$ with the HD map.

When it is determined that the predicted offset estimation value and the predicted error covariance $(X'_k, P'_k)$ match the HD map, the Track Management 510 ouputs the predicted offset estimation value and the error covariance $(X'_k, P'_k)$ as a final GPS data. However, when the predicted offset representative estimate and the error covariance (X'k P'k) do not match the HD map, the Track Management 510 do not use the predicted offset representative estimate and the error covariance (X'k P'k). The Track Management 510 performs the entire process again from the step 210 of FIG. 4.

That is, The controller 140 measures a plurality of offsets $(\Delta X_i, \Delta Y_i, \Delta \Theta_i)$ by matching the extracted feature with the radar data. The controller 140 obtains a confidence score and probability distribution based on IPDA for each of the measured offsets. The controller 140 calculates a probability distribution for the measured offsets based on the obtained confidence score and the probability distribution (400).

Once the probability distribution for the measured offsets is calculated, the controller 140 updates the offset estimation value and the error covariance using a Kalman filter (Track Update, 500). When the offset estimation value and the error covariance are updated, the controller 140 matches the HD map with the updated offset estimation value and the updated error covariance, and then the controller 140 determines whether to discard the offset estimation value and the error covariance (Track Termination, 511) or perform the Track Propagation (520).

When the confidence score $(\mu_k)$ is higher than the predetermined reference value, the controller 140 predicts the offset estimation value at the current point based on the dynamics model. The controller 140 again matches the predicted offset with the HD map and then re-performs the Track Management 510 which is determined whether to discard the predicted offset (Track Termination, 511) based on the matching.

When the predicted offset is matched with the HD map, the controller 140 outputs the predicted offset as GPS data. Through this, the controller 140 may modify or fixed a position of the vehicle 1 on the HD map.

The disclosed DAS 100 may perform accurate position measurement based on the matching of a plurality of features. Furthermore, it is possible to secure the expandability through the confidence scores and the probability distribution of each features, and ensure the safety of the driver through precise position measurement.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A driver assistance system (DAS) comprising:
a camera provided in a vehicle to have a field of view (FOV), and configured to acquire image data;
a radar sensor provided in the vehicle to have a field of sensing (FOS) including the region forward or a side of the vehicle, and configured to acquire radar data; a storage provided in the vehicle and storing an High Definition (HD) Map;
a controller including at least of one processor configured to process the image data acquired by the camera and the radar data acquired by the radar sensor,
wherein the controller extracts a feature included in the HD map based on the image data and the radar data, and modifies a Global Positioning System (GPS) data including the HD map according to a feature determined based on a confidence score of extracted feature and a probability distribution, and
wherein the controller extracts a plurality of features based on the image data and the HD map and measure a plurality of offsets by matching the plurality of features with the radar data.

2. The driver assistance system (DAS) according to claim 1, wherein the controller obtains the confidence score and the probability distribution based on Integrated Probabilistic Data Association (IPDA), and calculates a weight for the plurality of feature information determined based on the confidence score and the probability distribution.

3. The driver assistance system (DAS) according to claim 1, wherein the controller updates an offset estimation value included in the weight based on a Kalman filter.

4. The driver assistance system (DAS) according to claim 3, wherein the controller matches the updated offset estimation value with the HD map, and stops the modification of the GPS data based on the matching result.

5. The driver assistance system (DAS) according to claim 3, wherein the controller matches the updated offset estimation value with the HD map, and predicts the offset estimation value with an offset of the current time point at an offset of a current point based on the matching result and a dynamics model.

6. The driver assistance system (DAS) according to claim 5, wherein the controller matches the offset of the current point with the HD map, and stops the modification of the GPS data based on the matching result.

7. The driver assistance system (DAS) according to claim 5, wherein the controller matches the offset of the current point with the HD map, and modifies the GPS data based on the matching result and the offset of the current point.

8. The driver assistance system (DAS) according to claim 7, wherein the controller determines a location of the vehicle in the HD map based on the modified GPS data.

9. A controlling method of a driver assistance system comprising,
acquiring image data by a camera provided in a vehicle to have a field of view (FOV);
acquiring radar data by a radar sensor provided in the vehicle to have a field of sensing (FOS) including the region forward or a side of the vehicle;
storing a High Definition (HD) map by a storage after receiving the HD map from outside;
extracting a feature included in the HD map based on the image data and the radar data; and
modifying a Global Positioning System (GPS) data including the HD map according to a feature determined based on a confidence score of extracted feature and a probability distribution,
wherein the extracting comprises: extracting a plurality of features based on the image data and the HD map, and
wherein the modifying comprises: measuring a plurality of offsets by matching the plurality of features with the radar data.

10. The controlling method of a driver assistance system according to claim 9, wherein the modifying comprises:
obtaining the confidence score and the probability distribution based on Integrated Probabilistic Data Association (IPDA); and
calculating a weight for the plurality of feature information determined based on the confidence score and the probability distribution.

11. The controlling method of a driver assistance system according to claim 10, wherein the modifying comprises:
updating an offset estimation value included in the weight based on a Kalman filter.

12. The controlling method of a driver assistance system according to claim 11, wherein the modifying comprises:
matching the updated offset estimation value with the HD map; and
stopping the modification of the GPS data based on the matching result.

13. The controlling method of a driver assistance system according to claim 11, wherein the modifying comprises:
matching the updated offset estimation value with the HD map, and
predicting the offset estimation value with an offset of the current time point at an offset of a current point based on the matching result and a dynamics model.

14. The controlling method of a driver assistance system according to claim 13, wherein the modifying comprises:

matching the offset of the current point with the HD map; and stopping the modification of the GPS data based on the matching result.

15. The controlling method of a driver assistance system according to claim 13, wherein the modifying comprises:

matching the offset of the current point with the HD map; and modifying the GPS data based on the matching result and the offset of the current point.

16. The controlling method of a driver assistance system according to claim 15, further comprises:

determining a location of the vehicle in the HD map based on the modified GPS data.

* * * * *